UNIPOLAR TRANSISTORS

Filed Aug. 13, 1953

INVENTOR.
LAWRENCE J. GIACOLETTO

BY J. L. Whittaker

ATTORNEY.

2,984,752

UNIPOLAR TRANSISTORS

Lawrence J. Giacoletto, Princeton Junction, N.J., assignor to Radio Corporation of America, a corporation of Delaware Filed Aug. 13, 1953, Ser. No. 373,933

16 Claims. (Cl. 307—88.5)

This invention relates to semiconductor devices and particularly to unipolar transistors.

In a typical unipolar transistor, a body of semiconductor material is utilized to carry a current resulting from a flow of majority charge carriers between two non-rectifying electrodes bonded to the ends of the body. Where the majority charge carriers are electrons, the current flow, considered in the conventional sense, is opposite in direction to the flow of electrons. The flow both of "holes" and of conventional current is in the same direction. The body or crystal is provided with a P-N junction control electrode which includes regions of P-type and N-type semiconductor material separated by a rectifying barrier. This P-N junction electrode is employed to control the flow of current through the body. This control is effected by the application of a bias voltage and a signal voltage to the P-N junction electrode. The bias voltage is applied in the reverse direction between the control electrode and the semiconductor body. With such a bias voltage, the space charge associated with the P-N junction rectifying barrier penetrates into the semiconductor body and, in effect, reduces the cross-sectional area of the longitudinal path or channel available for current flow therethrough. By this means, the resistance of the current path is increased and current flow is decreased. The applied signal voltage effectively modulates the position of the junction space charge and thereby varies the resistance of the current path and the current flow.

Optimum current control is achieved by a P-N junction electrode, of the aforementioned type, if the electrode is of sufficient length and width to exert control of the entire current path. However, a problem arises if the current path and the control junction electrode are of any appreciable length. The problem results from the fact that the current flow longitudinally through the semiconductor body produces a voltage drop along the length of the body so that the portion of the body at the end of the current path is at a more negative potential than the portion of the body at the beginning of the current path. Thus, for N-type material there is a greater difference in potential between the semiconductor body and the reverse-biased control electrode at the beginning of the current path than at the end thereof. For P-type material, the greater difference in potential exists at the end of the current path. This variation in potential difference between the body and the control electrode results in a non-uniform current path and current control due to non-uniform penetration of the P-N junction space charge.

Accordingly, an important object of this invention is to provide a semiconductor device of new and improved form.

Another object of this invention is to provide an improved unipolar transistor.

A further object of this invention is to provide an improved unipolar transistor having uniformly operating control means.

In general the purposes and objects of this invention are accomplished, in one embodiment, by so forming and positioning a P-N junction within a semiconductor body that compensation is provided for the voltage drop along the body and the desired uniform control is thereby achieved. In another embodiment of the invention, a plurality of smaller or shorter control junctions are provided and each control junction has a separate and different bias applied thereto whereby compensation is provided for the voltage drop along the length of the semiconductor body due to current flow therein.

The invention is described in greater detail by reference to the drawing wherein.

Similar reference characters are applied to similar elements throughout the drawings.

Figure 1:
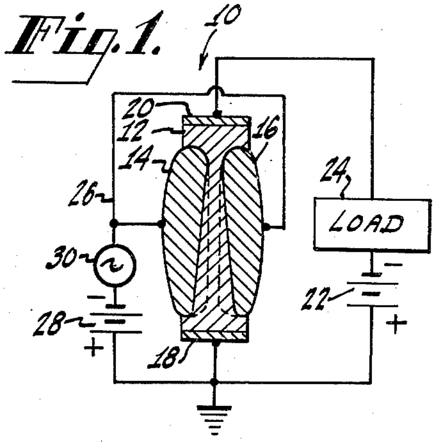
Fig. 1 is a sectional, elevational view of one embodiment of the invention and a circuit in which it may be operated.

Referring to Figure 1, a device 10 embodying the principles of the invention includes a semiconductor crystal 12 of germanium, silicon or the like of N-type or P-type conductivity. For the purposes of this description, the body or crystal 12 will be assumed to be N-type germanium. The crystal may be in cylindrical form or it may be of a rectangular cross-section. The germanium body or crystal includes a pair of oppositely-disposed P-N junction control electrodes 14 and 16 which may be formed in any suitable manner, for example, by a method described in a copending application of C. W. Mueller, Serial Number 295,304, filed June 24, 1952, and assigned to the assignee of this application, now abandoned.

Briefly, according to the method described in the aforementioned application, quantities of a suitable impurity material are positioned substantially in alignment on opposite surfaces of a germanium crystal and the assembly of crystal and impurity material is heated to a temperature sufficient to cause the impurity material to melt and alloy with the germanium and to form, on cooling, the desired P-N junction. The quantity of impurity is such that the junction electrodes 14 and 16 extend over substantially the entire surfaces into which the impurity materials have been alloyed. This provides large area efficient control within the crystal. The P-N junction control electrodes shown in Figures 1 through 4 may also be in the form of rings formed from rings of impurity material. For forming P-N junction electrodes in a body of N-type germanium, the impurity material may comprise one or more acceptor substances such as indium, aluminum, gallium, boron or zinc. For a germanium crystal of P-type conductivity, the impurity material may comprise one or more donor substances such as arsenic, bismuth, antimony, sulfur, selenium, tellurium or phosphorus.

According to the invention, the alloying operation is so controlled that the junctions penetrate into the semiconductor crystal unevenly so that penetration is greater at one end of the crystal than at the other as shown in Figure 1. This penetration control may be achieved by controlled heating which may be accomplished, for example, in an oven having separate and controllable heating elements therein. Uneven penetration may also be accomplished by employing properly shaped quantities of impurity material as described in a co-pending application of J. I. Pankove, Serial Number 343,945, Patent No. 2,937,960, filed March 23, 1953, and assigned to the assignee of this application.

After the alloying operation has been performed, a pair of non-rectifying electrodes 18 and 20 are soldered in ohmic contact to the ends of the crystal 12. The non-rectifying electrodes may also be soldered to the crystal before the alloying operation.

In operation of the device shown in Figure 1, wherein crystal 12 is assumed to be N-type germanium, a battery 22, is connected between the non-rectifying electrodes 18 and 20 with its positive terminal connected to the electrode 18 and its negative terminal connected to load 24 and thence to the other electrode 20 so that current flow proceeds longitudinally through the body from the end of the crystal wherein the P-N junctions are widely spaced to the end where they are closely spaced. The flow of electrons, which constitute the majority charge carriers for N-type material, is in the opposite direction to the "current flow".

A suitable load device 24, including an associated output circuit, is connected in series with the battery 22 and non-rectifying electrodes 18 and 20. The P-N junction electrodes 14 and 16 are connected together electrically by a lead 26 which is connected in turn to signal source 30 and thence to the negative terminal of a battery 28, the positive terminal of which is connected to the base electrode 18. By this arrangement, the control junctions 14 and 16 are biased in the reverse direction with respect to the germanium crystal. As shown, signal source 30 is also connected in series with the control electrodes and battery 28.

According to the invention, current flow between the non-rectifying electrodes 18 and 20 through the germanium crystal produces a voltage drop along the length of the crystal so that, with the arrangement shown, the body 12 is more negative at the end adjacent the electrode 20 than at the end adjacent the electrode 18. Thus, the potential difference between the body 12 and the P-N junction control electrodes 14 and 16, which are biased negatively with respect to the body, is greater at the end adjacent the electrode 18 than at the opposite end. Accordingly, the space charge region alongside the widely spaced portions of the control junction tends, at successive points along the current path to penetrate more deeply into the body than the space charge region alongside the more closely spaced portions. As a result of this variation in the penetration of the space charge regions and in the varying penetration of the P-N control electrodes along the length of the crystal, the control barriers within the crystal become substantially parallel as shown by the dotted lines in Figure 1 and uniform control along the path of the longitudinal current flow in the crystal is achieved.

Figure 2:
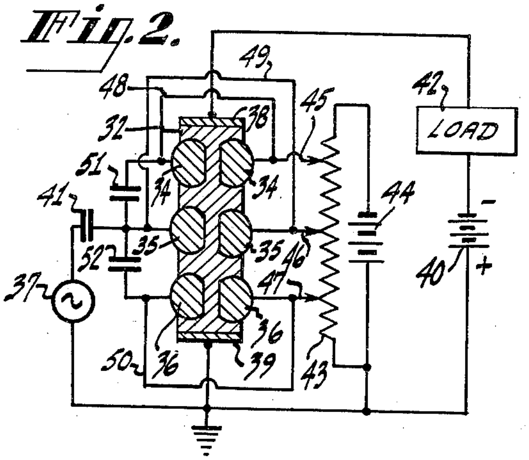
Fig. 2 is a sectional, elevational view of a second embodiment of the invention and a circuit in which it may be operated.

Referring to Figure 2, another embodiment of the invention includes a semiconductor crystal 32 of N-type germanium having a plurality of pairs 34, 35, 36 of P-N junction control electrodes formed along the length thereof. A pair of ohmic contact electrodes 38 and 39 are also provided at the ends of the crystal 32. In this embodiment, as an example, three pairs of control junctions are provided to perform the same function as the single pair 14 and 16 of the device 10. Accordingly, the individual members of each pair are smaller than the electrodes 14 and 16 of Figure 1 and they need not be formed with widely spaced and closely spaced portions. Compensation for the voltage drop in the body 32 is provided by the plurality of small electrodes and by the manner in which they are operated.

In operation of the embodiment of the invention shown in Figure 2, a battery 40 is connected between the base electrodes 38 and 39 to provide the desired longitudinal current flow through the germanium crystal 32. The battery may be oriented in either polarity. The load 42 is connected in series with the battery 40. According to the invention, each of the pairs of P-N junctions 34, 35, 36 is biased at a different voltage to provide compensation for the voltage drop along the length of the crystal. Thus, the largest negative bias voltage is applied to the junctions 34 adjacent to the end of the current path where the voltage drop is greatest, i.e., the difference in potential between the semiconductor body and the control electrodes is least; the lowest bias voltage is applied to junctions 36 adjacent to the beginning of the current path where the voltage drop is the least and the difference in potential between the semiconductor body and the control electrode is greatest. The other pair of junctions 35 is intermediately biased. Thus, each pair of control electrode junctions effectively establishes a space-charge depletion region alongside which tends to pentrate into the body to essentially the same extent and uniform control is thereby achieved.

Figure 3:
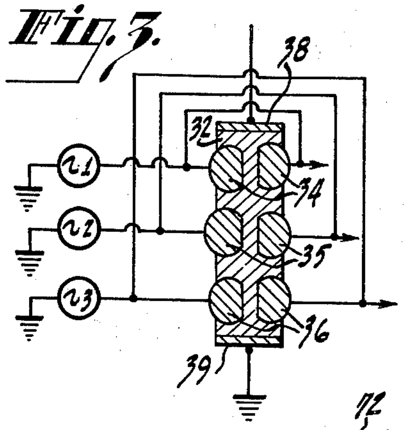
Fig. 3 is a portion of a modified circuit arrangement for the device of Fig. 2.
Figure 4:
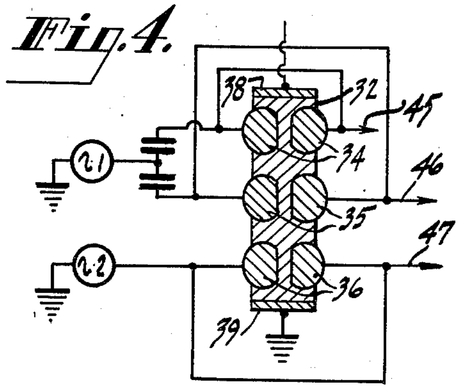
Fig. 4 is a portion of a modified circuit arrangement for the device of Fig. 2.

The several bias voltages for these control junctions may be derived from a bleeder resistor 43 connected across a battery 44 (or by proper connection to the battery 40). Tap connections 45, 46, 47 from the bleeder resistor (or from the battery 44) are made to each of the pairs of electrodes 34, 35, 36, respectively, the electrodes of each pair being electrically connected together by leads 48, 49, 50. By-pass capacitors 51 and 52 are coupled between the electrodes 34, 35 and 35, 36 respectively. An input signal from a common source 37 may be applied for example, by means of a capacitor 41 to each of the pairs of control electrodes as shown in Figure 2 to provide the desired control of the current flow through the crystal. Alternatively, for example to obtain mixer action, a separate signal may be applied to each pair of electrodes as shown in Figure 3, or two pairs of control electrodes, e.g., 34 and 35 may be connected to one signal source while the third pair 36 is connected to another signal source as shown in Figure 4. Whatever input signal arrangement is employed, the input signal applied to the control electrode junctions varies the penetration or contraction of the space-charge region thereof. This action of the control electrodes changes the resistance of the current path through the body 32 and thereby controls the current flow therethrough. Under some circumstances, it may be desirable to dispose the individual members of one or more pairs of control electrodes 34, 35, 36 at an angle with respect to each other within the crystal 32 just as the electrodes 14 and 16 are disposed in Figure 1.

Figures 5, 6, 7:
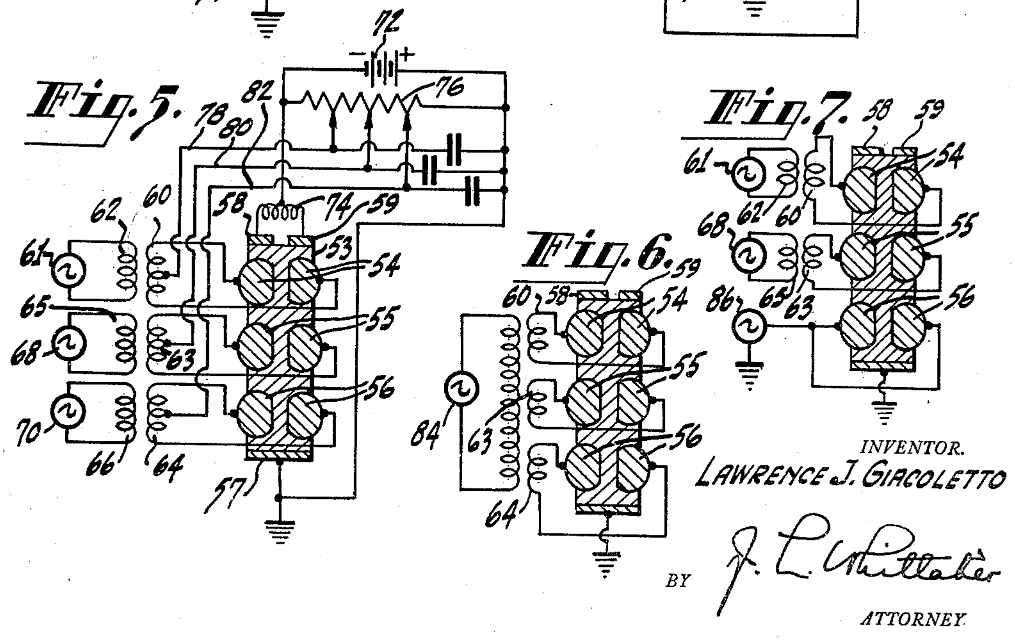
Fig. 5 is a sectional, elevational view of a third embodiment of the invention and a circuit in which it may be operated.
Fig. 6 is a portion of a modified circuit arrangement for the device of Fig. 5; and, Fig. 7 is a portion of a modified circuit arrangement for the device of Fig. 5.

In a third embodiment of the invention shown in Figure 5, a crystal or body 53 of N-type germanium is provided with several pairs, for example three pairs 54, 55, 56, of P-N junction control electrodes. A single large area non-rectifying electrode 57 is provided at one end of the crystal 53 and a pair of spaced non-rectifying electrodes 58 and 59 are mounted adjacent to each other at the other end thereof.

Each pair of control electrodes 54, 55, 56 is connected in push-pull relationship to a signal source. The electrodes 54 are connected each to one end of the secondary winding 60 of a transformer having a signal source 61 connected across its primary winding 62. The electrodes 55 and 56 are similarly connected to secondary windings 63 and 64 respectively of transformers, the primaries 65 and 66 of which are connected across signal sources 68 and 70.

A battery 72 is provided across the crystal 53 to direct a flow of current therethrough. One terminal of the battery is connected to the electrode 57, and the other terminal is connected to the mid-point of a load device 74, for example a transformer winding, the ends of which are connected to the electrodes 58 and 59.

A bleeder resistor 76 is connected in parallel with the battery 72 and tap connections 78, 80, 82 from selected points thereon to the midpoints of the coils 60, 63, 64, respectively, provide a different reverse bias on each pair of control electrodes 54, 55, 56 to compensate for the voltage drop along the body due to current flow therein. The voltage biases are such that, with no input signal, current flows between the electrodes of each pair substantially along the longitudinal axis of the body 53.

In operation of the device, since the control electrodes of each pair are operated in push-pull relationship, at any instant, one is positive and one is negative. Accordingly, at that instant one is biased even more in the reverse direction and its associated field penetrates further into the body. The other is biased less in the reverse direction and its associated field retracts toward the surface of the crystal 53. Thus, the longitudinal path of current flow through the body is displaced from the longitudinal axis and is directed to one or the other of the electrodes 58 and 59. As the input signal varies and the relative penetration and retraction of the field associated with the individual control electrodes varies, the path of current flow is shifted back and forth from the longitudinal axis.

As alternative arrangements, the input signals from the sources may be proportioned to alter the effective position of different pairs of control electrodes by different amounts. Or the control may be proportioned to move one pair a certain amount and successive pairs by greater amounts or vice versa. As a further modification, all of the control electrodes 54, 55, 56 may be energized from a single signal source 84 as shown in Figure 6. In addition, one or more pairs of control electrodes e.g. electrodes 56 may be connected together, as shown in Figure 7, to a signal source 86 to achieve uniform penetration and retraction of each electrode field of the pair and to control the resistance of the crystal current path and the current flow therethrough as in the device of Figure 2. In this embodiment the switching of the current to one or the other of the electrodes 58 and 59 is controlled by the pairs of electrodes 54 and 55.

What is claimed is:

1. A semiconductor device comprising a body of semiconductive material, conductive means ohmically connected to said body and defining the ends of a current path therethrough, biasing means connected to said conductive means for establishing a current flow along said current path and a voltage drop therealong, a rectifying electrode mounted on said body adjacent to and along a substantial portion of said current path, means for biasing said rectifying electrode in a reverse direction to establish a space-charge region along said current path for controlling the current flow between said conductive means, said rectifying electrode being angularly disposed with respect to said path to provide a space-charge region in compensating relationship to the normal non-uniformity of said path due to said voltage drop in the absence of said compensation, thereby providing a substantially uniform current path between said ends thereof.

2. A semiconductor device comprising a body of semiconductive material of one conductivity type, conductive means ohmically connected to said body and defining the ends of a current path therethrough, biasing means connected to said conductive means for establishing a flow of majority charge carriers along said path and a voltage drop therealong, an electrode of opposite conductivity type determining material mounted on said body and forming an area P-N junction therein along a substantial portion of said current path, means for biasing said rectifying junction to a high impedance condition to form a space-charge region penetrating said semiconductive body adjacent said P-N junction to control the current flow between said conductive means, said P-N junction being angularly disposed with respect to said path to provide a space-charge region in compensating relationship to the normal non-uniformity of said path due to said voltage drop in the absence of said compensation, thereby providing a substantially uniform current path between said ends thereof.

3. A semiconductor device comprising a body of semiconductive material of one conductivity type, conductive means ohmically connected to said body and defining the ends of a current path therethrough, biasing means connected to said conductive means for establishing a flow of majority charge carriers along said path and a voltage drop therealong, a pair of rectifying electrodes of an opposite conductivity type determining material mounted on said body and forming therewith a pair of opposed area rectifying junctions along a substantial portion of said current path, means for biasing said junctions to a high impedance condition to form a space-charge region penetrating said body adjacent said junctions to control the current flow between said conductive means, said rectifying junctions being angularly disposed with respect to said path and to each other in compensating relationship to the normal non-uniformity of said path due to said voltage drop in the absence of said compensation, thereby providing a substantially uniform current path between said ends thereof.

4. A semiconductor device comprising a body of semiconductive material, conductive means ohmically connected to said body and defining the ends of a current path therethrough, biasing means connected to said conductive means for establishing a current flow along said current path and a voltage drop therealong, a pair of rectifying electrodes mounted on said body and forming therewith a pair of opposed area rectifying junctions along a substantial portion of said current path, means for biasing said junctions to a high impedance condition to form a space-charge region penetrating said body adjacent said junctions to control the current flow between said conductive means, corresponding end portions of said rectifying junctions being comparatively closely spaced within said body at one end of said current path and the remaining corresponding portions of said junctions being progressively more widely spaced from each other, said spacing being in compensating relationship to the normal non-uniformity of said path due to said voltage drop in the absence of said compensation, thereby providing a substantially uniform current path between said ends thereof.

5. A semiconductor device comprising a body of semiconductive material of one conductivity type, conductive means ohmically connected to said body and defining the ends of a current path therethrough, biasing means connected to said conductive means for establishing a flow of majority charge carriers along said path and a voltage drop therealong, a pair of rectifying electrodes of an opposite conductivity type determining material mounted on said body and forming therewith a pair of opposed area P–N junctions along a substantial portion of said current path, means for biasing said junctions to a high impedance condition to form a space-charge region penetrating said body adjacent said junctions to control the current flow between said conductive means, corresponding end portions of said rectifying P-N junctions being comparatively closely spaced within said body at one end of said current path and the remaining corresponding portions of said P-N junctions being progressively more widely spaced from each other, said spacing being in compensating relationship to the normal non-uniformity of said path due to said voltage drop in the absence of said compensation, thereby providing a substantially uniform current path between said ends thereof.

6. A semiconductor device comprising a body of semiconductive material, conductive means ohmically connected to said body and defining the ends of a current path therethrough, biasing means connected to said conductive means for establishing a current flow along said current path and a voltage drop therealong, a plurality of pairs of rectifying electrodes mounted on said body and forming therewith a plurality of pairs of opposed area rectifying junctions along said current path, means for selectively biasing said pairs of junctions to a high impedance condition to form space-charge regions penetrating said body adjacent said pairs of junctions to control the current flow between said conductive means, said pairs of said rectifying junctions being individually biased to form space-charge regions in compensating relationship to the normal non-uniformity of said path due to said voltage drop in the absence of said compensation, thereby providing a substantially uniform current path between said ends thereof.

7. A semiconductor device comprising a body of semiconductive material, conductive means ohmically connected to said body and defining the ends of a current path therethrough, biasing means connected to said conductive means for establishing a current flow along said current path and a voltage drop therealong, a plurality of pairs of rectifying electrodes mounted on said body and forming therewith a plurality of pairs of opposed area rectifying junctions in aligned spaced relationship along said current path, means for selectively biasing said pairs of junctions to a high impedance condition to form space charge regions penetrating said body adjacent said pairs of junctions to control the current flow between said conductive means, each successive one of said pairs of rectifying junctions taken in a particular direction along the length of said current path being biased more strongly to a high impedance condition than the preceding pair to provide space-charge regions in compensating relationship to the normal non-uniformity of said path due to said voltage drop in the absence of said compensation, thereby providing a substantially uniform current path between said ends thereof.

8. A semiconductor device comprising a body of semiconductive material, conductive means ohmically connected to said body and defining the ends of a current path therethrough, biasing means connected to said conductive means for establishing a current flow along said current path and a voltage drop therealong, a plurality of pairs of rectifying electrodes mounted on said body and forming therewith a plurality of pairs of opposed area rectifying junctions in aligned spaced relationship along said current path, means for selectively biasing said pairs of junctions to a high impedance condition to form space-charge regions penetrating said body adjacent said pairs of junctions to control the current flow between said conductive means, each successive one of said pairs of rectifying junctions taken in a particular direction along the length of said current path being biased more strongly to a high impedance condition than the preceding pair to provide space-charge regions in compensating relationship to the normal non-uniformity of said path due to said voltage drop in the absence of said compensation, thereby providing a substantially uniform current path between said ends thereof, and a signal source connected to each of said pairs of electrodes for selectively varying said space-charge regions to thereby selectively constrict or expand said current path.

9. A unipolar semiconductor device comprising a body of semiconductive material of one conductivity-type, a plurality of pairs of control electrodes of an opposite conductivity-type-determining material disposed along the length of said body and forming opposed area rectifying P-N junctions therein, a non-rectifying electrode connected to one end of said body and a pair of spaced non-rectifying electrodes connected to the other end of said body.

10. A unipolar semiconductor device comprising a body of semiconductive material of one conductivity type, a non-rectifying electrode connected to one end of said body, a pair of spaced non-rectifying electrodes connected to the other end of said body, biasing means connected to said non-rectifying electrodes for establishing a flow of majority charge carriers between the ends of said body, a plurality of pairs of control rectifying electrodes of an opposite conductivity determining material disposed along the length of said body and forming a plurality of pairs of opposed area rectifying junctions therein, means for biasing each said pairs of junctions to a high impedance condition to form a space-charge region penetrating said body adjacent said junctions, each of said pairs of electrodes taken in a particular direction along the length of said body being biased progressively more strongly in the reverse direction.

11. A unipolar semiconductor device comprising a body of semiconductive material of one conductivity type, a non-rectifying electrode connected to one end of said body, a pair of spaced non-rectifying electrodes connected at the other end of said body, biasing means connected to said non-rectifying electrodes for establishing a flow of majority charge carriers between the ends of said body, a plurality of pairs of control rectifying electrodes of an opposite conductivity determining material disposed along the length of said body and forming a plurality of pairs of opposed area rectifying junctions therein, means for biasing each said pairs of junctions to a high impedance condition to form a space-charge region penetrating said body adjacent said junctions, each of said pairs of electrodes taken in a particular direction along the length of said body being biased progressively more strongly in the reverse direction, a signal source connected to at least one said pair of opposed electrodes for applying control signals thereto, said signal varying the space-charge region along its respective P-N junction to thereby constrict or expand said current path.

12. A unipolar semiconductor device comprising a body of semiconductive material of one conductivity type, a non-rectifying electrode bonded to one end of said body, a pair of spaced non-rectifying electrodes bonded to the other end of said body, biasing means connected to said non-rectifying electrodes for establishing a flow of majority charge carriers between the ends of said body, a plurality of pairs of control rectifying electrodes of an opposite conductivity type determining material disposed along the length of said body and forming a plurality of pairs of opposed area rectifying junctions therein, means for biasing each said pairs of junctions to a high impedance condition to form a space-charge region penetrating said body adjacent said junctions, each of said pairs of electrodes taken in a particular direction along the length of said body being biased progressively more strongly in the reverse direction, an input signal source connected to the individual electrodes of at least one of said pairs in push-pull relationship whereby current flow from said one end of said body is selectively directed to one or the other of said pair of non-rectifying electrodes.

13. In a unipolar semiconductor device having a body of semiconductive material of one conductivity type, conductive means connected to said body defining the ends of a current path therethrough, biasing means connected to said conductive means for establishing a current consisting of a flow of majority charge carriers along said current path and a consequent voltage drop therealong, an electrode of an opposite conductivity type determining material mounted on said body and forming an area rectifying P-N junction therein along a substantial portion of said current path, means for reverse biasing said junction in a high impedance direction to provide a space-charge region along said current path for controlling the flow of current therealong, an increase or decrease in reverse bias serving respectively to constrict or expand said current path, interaction between said controlling space-charge region and said flow of majority carriers normally providing a non-uniform current path between said ends thereof because of the voltage drop therealong, the improvement which consists in said rectifying junction along a substantial portion of said current path being angularly disposed with respect thereto to provide an altered space-charge region in compensating relationship to said normally non-uniform current path to thereby provide a substantially uniform current path between said ends thereof.

14. A field effect transistor comprising a channel region, source and drain connections, and at least one gate, said transistor having an effective channel of substantially uniform width.

15. A field effect transistor comprising a channel region having source and drain connections, and a gate region forming a junction therewith, said channel region widening towards the drain end whereby the space charge layer forms an effective channel having substantially uniform width.

16. A field effect transistor comprising a channel region having source and drain connections, a gate region forming a junction therewith, said channel region widening toward the drain, and means for applying a gate voltage to said transistor whereby the space charge layer forms an effective channel having substantially uniform width.

References Cited in the file of this patent

UNITED STATES PATENTS

| | | |
|---|---|---|
| 2,569,347 | Shockley | Sept. 25, 1951 |
| 2,586,080 | Pfann | Feb. 19, 1952 |
| 2,600,500 | Haynes | June 17, 1952 |
| 2,623,102 | Shockley | Dec. 23, 1952 |
| 2,648,805 | Spenke et al. | Aug. 11, 1953 |
| 2,654,059 | Shockley | Sept. 29, 1953 |
| 2,655,607 | Reeves | Oct. 13, 1953 |
| 2,655,625 | Burton | Oct. 13, 1953 |
| 2,666,814 | Shockley | Jan. 19, 1954 |
| 2,744,970 | Shockley | May 8, 1956 |
| 2,754,431 | Johnson | July 10, 1956 |
| 2,756,285 | Shockley | July 24, 1956 |